(12) United States Patent
Dorrance et al.

(10) Patent No.: US 9,805,697 B1
(45) Date of Patent: Oct. 31, 2017

(54) METHOD FOR TIRE TREAD DEPTH MODELING AND IMAGE ANNOTATION

(71) Applicant: Hunter Engineering Company, St. Louis, MO (US)

(72) Inventors: Daniel R. Dorrance, Ballwin, MO (US); Nicholas J. Colarelli, III, Creve Coeur, MO (US); Timothy A. Strege, Sunset Hills, MO (US)

(73) Assignee: Hunter Engineering Company, St. Louis, MO (US)

( * ) Notice: Subject to any disclaimer, the term of this patent is extended or adjusted under 35 U.S.C. 154(b) by 54 days.

(21) Appl. No.: 13/835,241

(22) Filed: Mar. 15, 2013

Related U.S. Application Data

(60) Provisional application No. 61/654,216, filed on Jun. 1, 2012, provisional application No. 61/759,240, filed on Jan. 31, 2013.

(51) Int. Cl.
| | |
|---|---|
| *G01M 17/02* | (2006.01) |
| *G01B 11/22* | (2006.01) |
| *G01B 21/18* | (2006.01) |
| *G01N 21/95* | (2006.01) |
| *G09G 5/40* | (2006.01) |
| *B60C 99/00* | (2006.01) |
| *H04N 13/02* | (2006.01) |

(52) U.S. Cl.
CPC ............. *G09G 5/40* (2013.01); *B60C 99/006* (2013.01); *H04N 13/0203* (2013.01)

(58) Field of Classification Search
CPC .................................................... G01M 17/02
USPC .................................................. 348/46; 3/46
See application file for complete search history.

(56) References Cited

U.S. PATENT DOCUMENTS

| | | | |
|---|---|---|---|
| 3,815,407 A | * | 6/1974 | Lavery ............................ 73/582 |
| 3,918,816 A | | 11/1975 | Foster et al. |
| 5,054,918 A | | 10/1991 | Downing et al. |
| 5,245,867 A | | 9/1993 | Sube et al. |
| 5,249,460 A | * | 10/1993 | Dory ................... G01M 17/027 356/431 |
| 5,895,845 A | | 4/1999 | Burger |
| 5,987,978 A | | 11/1999 | Whitehead |

(Continued)

FOREIGN PATENT DOCUMENTS

| | | |
|---|---|---|
| DE | 4316984 A1 | 8/1994 |
| DE | 19705047 A | 8/1998 |

(Continued)

*Primary Examiner* — Dave Czekaj
*Assistant Examiner* — Alison Slater
(74) *Attorney, Agent, or Firm* — Polster, Lieder, Woodruff & Lucchesi, LC

(57) ABSTRACT

A vehicle service system having a means for acquiring images of a three-dimensional region of a vehicle wheel assembly tire tread surface. The vehicle service system is configured to process the acquired images to produce a collection of data points corresponding to the spatial position of surface points in the region from which tire tread wear characteristics are identified. The acquired images are further utilized to provide both a graphical and a numerical display to an operator, with the numerical display linked to specifically annotated or indexed points or windows within the graphical display, thereby enabling an operator to quickly identify specific focus points or regions on the tire surface which have been measured at the numerically identified tread depths.

28 Claims, 13 Drawing Sheets

(56) References Cited

U.S. PATENT DOCUMENTS

| | | | |
|---|---|---|---|
| 6,034,676 A * | 3/2000 | Egan et al. | 701/31.4 |
| 6,069,966 A | 5/2000 | Jones et al. | |
| 6,539,788 B1 * | 4/2003 | Mancosu et al. | 73/146 |
| 6,789,416 B1 | 9/2004 | Tracy et al. | |
| 7,269,997 B2 | 9/2007 | Dale | |
| 7,454,841 B2 | 11/2008 | Burns, Jr. et al. | |
| 7,466,430 B2 | 12/2008 | Braghiroli | |
| 7,523,655 B2 | 4/2009 | Braghiroli | |
| 7,583,372 B2 | 9/2009 | Shylanski et al. | |
| 7,797,995 B2 | 9/2010 | Schafer | |
| 7,975,540 B2 | 7/2011 | Angell | |
| 8,065,911 B2 | 11/2011 | Taylor | |
| 8,079,254 B2 | 12/2011 | Braghiroli et al. | |
| 8,141,414 B2 | 3/2012 | Braghiroli | |
| 8,171,783 B2 | 5/2012 | Tracy et al. | |
| 8,312,766 B2 | 11/2012 | Pingel | |
| 8,558,680 B2 | 10/2013 | Pannek | |
| 8,621,919 B2 | 1/2014 | Pingel | |
| 8,625,105 B2 | 1/2014 | Pryce et al. | |
| 8,793,109 B2 | 7/2014 | Sotgiu et al. | |
| 2006/0273148 A1 * | 12/2006 | Karstens | B60C 11/24 235/375 |
| 2006/0274302 A1 * | 12/2006 | Shylanski et al. | 356/139.09 |
| 2010/0139383 A1 | 6/2010 | Haswell et al. | |
| 2010/0180676 A1 * | 7/2010 | Braghiroli et al. | 73/146 |
| 2012/0204632 A1 | 8/2012 | Kirstatter | |
| 2013/0169813 A1 | 7/2013 | Schaefer | |
| 2013/0278771 A1 | 10/2013 | Magoun et al. | |
| 2014/0043472 A1 | 2/2014 | Takahashi et al. | |
| 2014/0232852 A1 * | 8/2014 | Nobis | G01B 11/22 348/128 |

FOREIGN PATENT DOCUMENTS

| | | | |
|---|---|---|---|
| DE | 19705047 A1 | 8/1998 | |
| DE | 102012202271 * | 2/2012 | G01B 11/22 |
| EP | 0469948 B1 | 10/1995 | |
| EP | 0469948 B1 | 11/1995 | |
| EP | 1515129 B1 | 8/2005 | |
| EP | 1148328 B1 | 11/2005 | |
| EP | 1947419 A1 | 7/2008 | |
| EP | 1952092 B1 | 4/2009 | |
| EP | 1751493 B1 | 8/2013 | |
| JP | H07-92058 A | 4/1995 | |
| JP | 8122043 A | 5/1996 | |
| WO | 9610727 A1 | 4/1996 | |
| WO | 9707380 A2 | 2/1997 | |
| WO | 2010100417 A2 | 9/2010 | |
| WO | 2010115390 A1 | 10/2010 | |
| WO | 2012004411 A1 | 1/2012 | |
| WO | 2013007479 A1 | 1/2013 | |
| WO | 2014095142 A1 | 6/2014 | |
| WO | 2014114403 A1 | 7/2014 | |

* cited by examiner

METHOD FOR TIRE TREAD DEPTH MODELING AND IMAGE ANNOTATION

CROSS-REFERENCE TO RELATED APPLICATIONS

The present application is related to, and claims priority from, both U.S. Provisional Patent Application Ser. No. 61/654,216 filed on Jun. 1, 2012 and U.S. Provisional Patent Application Ser. No. 61/759,240 filed on Jan. 31, 2013, each of which is herein incorporated by reference.

STATEMENT REGARDING FEDERALLY SPONSORED RESEARCH

Not Applicable.

BACKGROUND OF THE INVENTION

The present invention relates generally to machine vision vehicle service systems configured to measure parameters associated with one or more wheel assemblies on a vehicle, and more particularly, to a vehicle service system and methods for acquiring and processing image data representative of a three-dimensional region of a tire tread surfaces associated a vehicle wheel assembly to provide an operator with information related to the condition of the tire tread.

It is well known that the condition of the tires of a motor vehicle, and in particular, the condition of the tire tread, can have a significant impact on the performance of the vehicle as well as be indicative of potential problems with the vehicle. For example, tires with excessive tread wear lack the ability to evacuate water from the contact patch region when traveling over wet road surfaces, leaving the vehicle dangerously susceptible to hydroplaning and a loss of control. Uneven tread wear across the width of a tire's outer surface may be indicative of an improper wheel alignment or a broken component in the vehicle suspension system. Improper inflation of a tire can result in the failure of the tire to properly support the vehicle, leading to bulges in the tire sidewall adjacent to the contact patch, and excessive fuel consumption by the vehicle.

A number of measurements systems for obtaining a measure of tire tread depth for a motor vehicle wheel at a limited number of discrete points or locations about the tire circumference are known. For example, U.S. Pat. No. 7,797,995 B2 to Frank H. Schafer discloses a device for detecting a profile depth and/or profile type of a motor vehicle wheel traveling in a straight line, at a constant speed, over a narrow-width sensor embedded in a roadway surface. A laser is scanned across the exposed segment of the tire, and images acquired which are processed to evaluate the tire profile depth and type at the observed location. However, the design of the '995 system limits the measurement of profile depth and type to a very small sliver of the tire, which is visible for the brief moment when the tire passes directly over the embedded sensor.

International patent application WO 2010/115390 to Ulrich Pingel sets forth a system for measuring the tread depth of a vehicle tire where the profile of the tire is observed across one measuring line by a laser or light emanating from a light source in a fan beam pattern, and which is reflected back to a sensor. The signal of the reflected fan beam is evaluated using a triangulation method to determine a measure of the tire tread depth across the illuminated line of the tire surface.

U.S. Pat. No. 6,789,416 B1 Tracy et al. sets forth a tire tread scanner configured to be positioned against a tire tread surface, and which utilizes a laser scanner to scan a laser transversely across the tread surface while measuring the range between the emitter and the tire tread surface, thereby producing a two-dimensional profile of the tire tread at the position of the scanner.

A similar laser scanner for measuring tire tread depth across the width of a tire is shown in International patent application WO 2010/100417 A2 to Pryce et al, and employs a laser line generate to generate an elongate pattern of light which is reflected onto the surface of a tire. Reflected light from the tire is then acquired at an associated camera to obtain a linear image of the illuminated tire tread.

While many of the known systems for measuring tire tread depth employ optical scanning technology to acquire tire tread depth data, the data is acquired across a very limited portion of the tire tread, often limited to a single linear scan across the tire surface. Other prior art systems use only a few linear scans of tire tread depth data, thus lacking a means to provide an accurate representation of the tire tread wear or characteristics over a region on the tire surface or over the entire circumference of the tire. Such systems vary in accuracy depending upon the particular portion of a tire tread pattern which is imaged by the linear scan.

Yet other prior art systems that may obtain enough data to construct a point-cloud do not take full advantage of the additional data, and still try to identify only particular grooves or specific locations on the tire where tread-depth is determined (i.e. in a groove near the inner edge, in a groove near the middle of the tire, and in a groove near the outer edge), thereby ignoring most of the acquired data.

Accordingly, there is a need in the automotive service industry to provide both a vehicle operator and a vehicle service technician with information regarding the condition of the tires mounted to a vehicle, including a measure of the tire tread depth and contact patch parameters over an entire region or circumferential surface of the tire. There is further a need in the automotive service industry to provide an accurate and repeatable measure of tire tread wear and tire condition which accommodates the changes in a tire tread pattern within the observed region on the tire surface and which can be tolerant of the presence of tire damage and/or foreign object embedded within the tire tread pattern.

There is a further need in the automotive service industry to provide an improved method for displaying to an operator tire tread depth data acquired over a region of the tire surface. Systems which provide the operator with a two-dimensional or three-dimensional often rely exclusive on a spectrum of colors to indicate the depth of the tire tread at various points. While such displays are visually interesting to an operator, they are actually difficult to use when trying to determine a tread depth measurement at a specific point within the observed region, as the operator must determine exactly what color corresponds with each measurement in the region of interests.

Accordingly, it would be beneficial to provide an operator with an annotation or other indication in the two-dimensional or three-dimensional image of the tire tread depth which is associated with a specific numerical value of the measured tire tread depth at that point or over a selected region. It would be further advantageous to enable an operator to selectively reposition the focus of the annotation or other indicator within the two or three-dimensional image to view a numerical representation of measured tread depth at a different selected position or region on the tire surface.

Finally, it would be advantageous to provide an operator with a means to selectively view or highlight those portions of a two or three-dimensional image which illustrate portions of a tire tread having a depth equal to less than selected numerical value.

Tire tread depth, as an indication of tire wear, is but one indicator of the overall state of a vehicle, and can be influenced by a number of factors, including tire pressure, operator driving style, wheel alignment settings, and suspension components. Accordingly, it would be advantageous to provide a method for illustrating the interactive effects of one or more of these indicators on a two or three-dimensional image of tire tread depth over time. It would be further beneficial to provide a method by which identified problems in other areas of the vehicle, for example, a vehicle's wheel alignment, can be used to direct an operator's attention to specific features or trends observed in measurements of remaining tire tread depth.

BRIEF SUMMARY OF THE INVENTION

The present application sets forth a vehicle service system having a means for acquiring images of a three-dimensional region of a vehicle wheel assembly tire tread surface, and which is configured to process the acquired images to produce a collection of data points corresponding to the spatial position of points in the region on the surface of the tire tread, from which tire tread wear characteristics over the region, including tread outer surface, tread depth, tread irregularities, and embedded foreign objects are identified and used to provide both a graphical and a numerical display to an operator. The numerical display is linked to specifically annotated or indexed points on the graphical display, enabling an operator to quickly identify the specific focus points or windowed region on the tire surface which has been measured at the numerically identified tread depths.

In an embodiment of the present application, the vehicle service system is configured with a laser illumination and an associated imaging system or stereoscopic image sensors, to acquire images of a three-dimensional region of the tire tread surface, from which a set of data points defining point cloud representative of a tire surface region are extracted. The data points are processed by the vehicle service system to develop a depth map of the observed region of the tire surface, and are represented in a cylindrical coordinate system having an axis which is approximately aligned with the rotational axis of the vehicle wheel. Data from the depth map is manipulated in the cylindrical coordinate system to generate a histogram of points which are representative of the tire tread outer surface and tire tread valleys, from which tire wear, tread depth, tread irregularities, and embedded foreign objects within the region may be identified.

In a further embodiment of the present disclosure, a two or three-dimensional display of tire tread depth over a region of a tire surface includes one or more user-positionable focus points or windows which are linked to associated displays of numerical data. Each display of numerical data corresponds to an actual or averaged tire tread depth measurement at the point or region in the two or three-dimensional image corresponding to the associated user-positionable focus point or windows. Using any suitable graphical-user-interface procedures, an operator may select and reposition an associated user-positionable focus point or window within the two or three dimensional image, and receive an update to the numerical data which is representative of the actual or average tire tread depth measurement at the repositioned point or window.

In a further embodiment of the present disclosure, tire tread depth data is associated with additional vehicle data acquired through other sources, such as a vehicle wheel alignment system or a vehicle brake testing system before presentation to an operator. The associated data may be utilized to predict how a tire may continue to wear, or how various factors may influence the handling characteristics of the vehicle. Similarly, specific patterns of tire wear, in combination with other observed characteristics of a vehicle may be utilized to suggest specific repairs or alterations to the vehicle to improve vehicle handling, performance, or safety.

The foregoing features, and advantages set forth in the present disclosure as well as presently preferred embodiments will become more apparent from the reading of the following description in connection with the accompanying drawings.

BRIEF DESCRIPTION OF THE SEVERAL VIEWS OF THE DRAWINGS

In the accompanying drawings which form part of the specification.

Corresponding reference numerals indicate corresponding parts throughout the several figures of the drawings. It is to be understood that the drawings are for illustrating the concepts set forth in the present disclosure and are not to scale.

Figure 1:
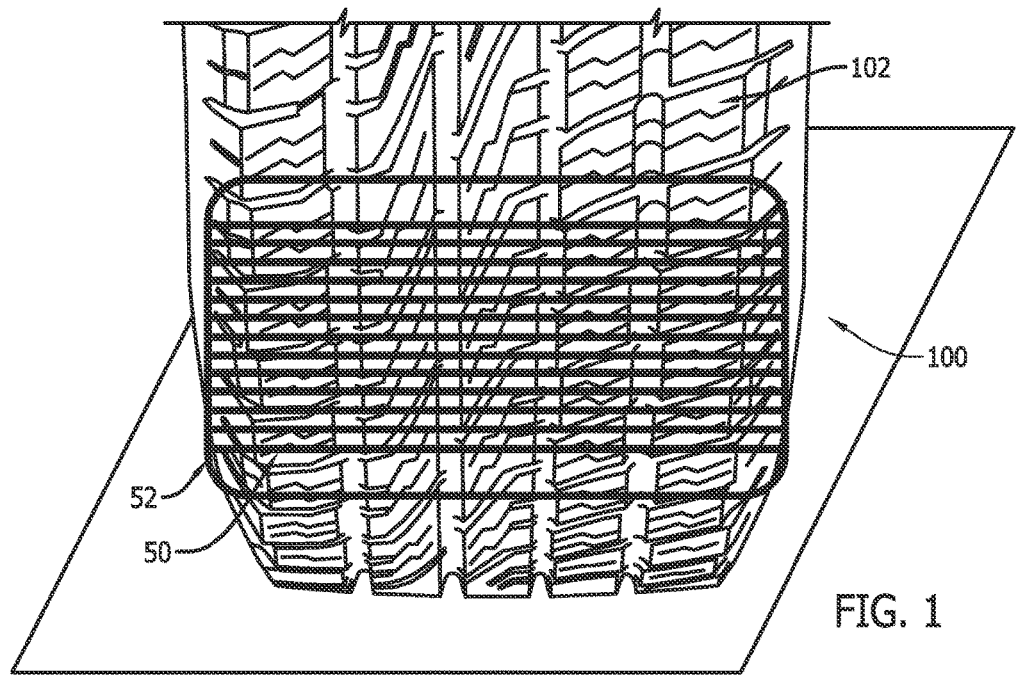
FIG. 1 is a perspective view of a tire tread surface for a wheel assembly, illustrating an exemplary three-dimensional region of tire tread intersected by multiple lines of scanning laser illumination within a bounded field of view.

Before any embodiments of the invention are explained in detail, it is to be understood that the invention is not limited in its application to the details of construction and the arrangement of components set forth in the following description or illustrated in the drawings.

DETAILED DESCRIPTION

The following detailed description illustrates the invention by way of example and not by way of limitation. The description enables one skilled in the art to make and use the present disclosure, and describes several embodiments, adaptations, variations, alternatives, and uses of the present disclosure, including what is presently believed to be the best mode of carrying out the present disclosure.

As used herein, the phrase "vehicle wheel assembly" is used generally to refer to an assembly consisting of a tire mounted to a vehicle wheel rim, however, it will be understood that the phrase is not limited there to, and is considered to include simply an unmounted tire without a vehicle rim.

Data acquired through machine vision imaging sensors used by vehicle service systems and vehicle inspection systems can be utilized in a variety of ways, including the development of a virtual model of an object being imaged, such as a vehicle wheel assembly, from a collection of discrete data points in three-dimensional space identified in acquired images. The collection of discrete data points is referred to as a "point cloud", as it can be represented by individual points of data having assigned coordinates in the three-dimensional space. Various techniques and procedures can be utilized to develop or "build up" a point cloud of data points.

In one embodiment, a point cloud of data points is generated by utilizing a laser line illumination source to project laser lines 50 onto a region 52 on the surface of the object being viewed, in this case, a vehicle wheel assembly 100 tire tread surface 102, such as shown in FIG. 1, and the resulting reflected light captured by an imaging sensor or camera. The region may be either a limited portion of the object's surface, or if the object is fully or partially rotated, may encompass a significant portion or an entire surface of the object. For example, if a vehicle wheel assembly 100 is mounted to a rotating shaft, such as in a balancer system, a tire changer system, or an axle of a supported vehicle, the region may encompass the entire circumference of tire tread surface 102, as the tire tread surface is rotated through a field of view associated with the imaging sensor or camera. Alternatively if the wheel assembly 100 is mounted to a vehicle, and a hand-held scanning system or a drive-over scanning system is utilized, the region may encompass only a portion of the tire tread surface 102.

Once acquired, the captured images of the reflected laser light are processed to identify a plurality of discrete data points representative of points on the surface of the object illuminated by the projected laser light 50. By illuminating a region of on the surface of the object, sufficient points can be identified to develop the point cloud which is representative of the configuration of the object surface, such as the configuration of the tire tread surface 102 for an observed region of a vehicle wheel assembly 100.

Alternative methods, such as shown in U.S. Pat. No. 7,583,372 B2 to Shylanski et al. employing stereoscopic imaging sensors to directly view an object, and in U.S. Pat. No. 7,454,841 B2 to Burns, Jr. et al., acquiring images of projected light patterns on the surfaces of an object, both of which are herein incorporated by reference. For example, as set forth in U.S. Pat. No. 7,583,372 B2, the building up a "point-cloud" of three-dimensional points on the surface of a wheel assembly involves identifying the correspondence between features or areas of interest in the image from one imaging sensor with features or areas of interest in the image(s) from other imaging sensors in the a stereo imaging system.

For stereoscopic systems, once the coordinates of features or areas of interest in multiple images have been estimated, stereo triangulation is applied to identify three-dimensional coordinates of the features or areas of interest. Since vehicle wheel assemblies vary greatly in appearance, it is useful to locate surface points by matching an arbitrary area of interest or "patch" from an image generated by one imaging sensor of the stereo imaging sensor set with a corresponding area of interest or "patch" from an image generated by a different imaging sensor of the stereo set. Those of ordinary skill in the art will recognize that the area of interest or "patch" may constitute an entire generated image, or may be a subset of a generated image.

To ensure that the three-dimensional point coordinates can be estimated to sufficient precision, the two-dimensional coordinates of the matched areas of interest or patches in the multiple imaging sensor views may be measured to a precision finer than the width of a single image pixel. For a given "master" patch from a first imaging sensor's image, a search is conducted to identify a corresponding patch from the second imaging sensor's image that constitutes the best match. The offsets between the coordinates of the master patch and those of the patch having the best match in the second image are typically non-integer values. However, the search is started by identifying the integer coordinate offsets that fit best. The best match involving integer coordinate offsets is usually within a few pixels of the more general best fit that allows non-integer offsets. The merit of a given potential match is evaluated by computing a similarity error function, for example, summing the square of the difference in image brightness over all corresponding pixels in the patches. This sum is then normalized by the number of pixels in the patch.

With sufficient predetermined information describing the mathematical characteristics of the optics associated with an imaging sensor, the three-dimensional configuration of an object being imaged, and the relative locations of the object and the imaging sensor, it is possible to predict the size and shape of the apparition of the three-dimensional object in a two-dimensional image generated by the imaging sensor. The mathematical model of the imaging sensor enables identification of how the visible features of the three-dimensional object will be projected to corresponding features in the two-dimensional image. If the three-dimensional model of the object includes color or gray-level appearance of numerous points distributed across the three-dimensional object's exterior surfaces, a realistic image of the object can be constructed.

Figure 2:
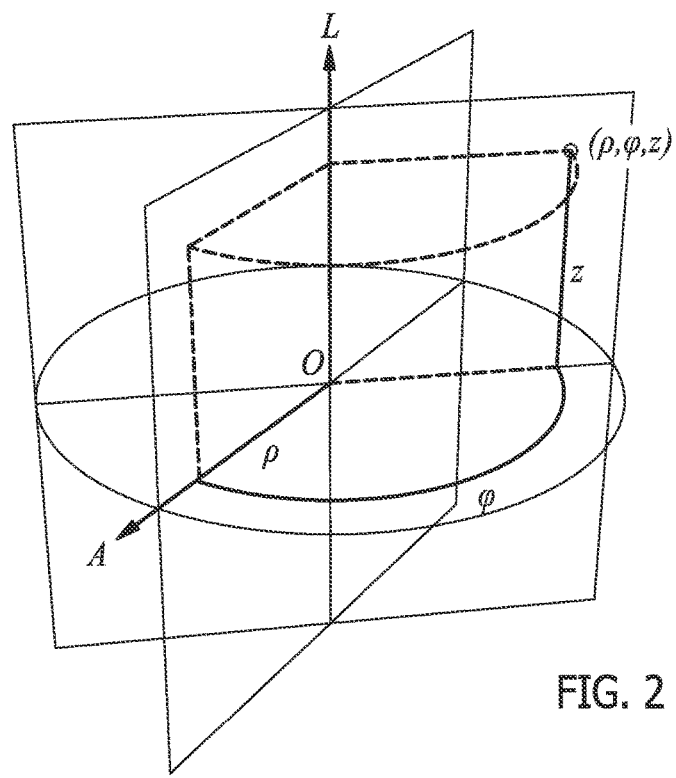
FIG. 2 is a perspective illustration of a cylindrical coordinate system for representing data points in a depth map of a tire surface patch.

A simple model of a vehicle wheel assembly approximates the wheel assembly as a solid of revolution about the axis of rotation. The preferred coordinate system for this model is a cylindrical coordinate system, such as shown in FIG. 2, which establishes an origin at the three-dimensional location of the center of the wheel, and the Z-axis along the estimated axis of rotation for the wheel assembly 100 based on the location of the outermost surface points. Identification of the outer surface point in camera coordinates is based on analysis of the imagery and knowledge of the geometry of the cameras positions relative to the vehicle wheel assembly 100. Data points in the point-cloud of image data for a region of the tire tread surface 102 (or for a complete circumference of the tire tread surface) are then transformed into the cylindrical coordinate system and projected onto a common two-dimensional plane by zeroing the theta cylindrical coordinate value, effectively collapsing all of the three-dimensional points for the observed three-dimensional region onto a two-dimensional cross-section of the wheel assembly 100, cut by a plane through the axis of rotation for the wheel.

Figure 3:
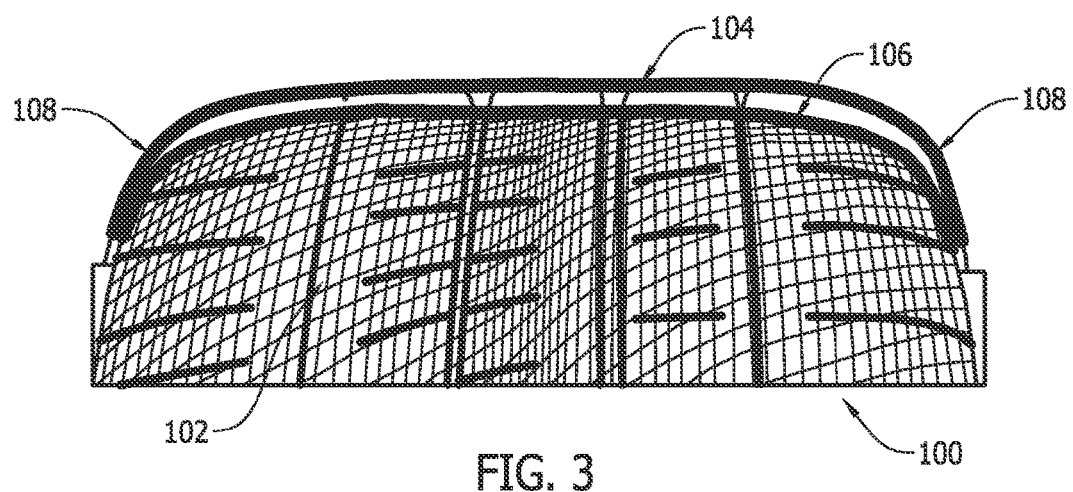
FIG. 3 is a perspective view of a tire with the outer tread surface rendered transparent, illustrating curve-fit lines for the tire tread outer surface and tire tread lower surface.

Curves fit through the two-dimensional projection of points are utilized to estimate the actual tire tread pattern surfaces 104, 106 and sidewalls 108, as seen in FIG. 3, and visible wheel rim profile of the wheel assembly cross-section. If the cylindrical coordinate system is aligned with the physical sidewall and visible rim profile of the wheel assembly 100, and the three-dimensional point error is randomly distributed, then the average two-dimensional distance from a three-dimensional point to the cross section will be minimized. The three-dimensional error associated with each point corresponds to the distance between the point and the curve fitted through the projection of the points. Summing the squares of all these point errors yields a global error function that will minimize when the cylindrical coordinate system is aligned with the physical wheel/tire sidewall. This enables an iterative mathematical optimization algorithm, such as the Levenberg-Mamardt optimization to move the cylindrical frame origin in two dimensions to the center of the vehicle wheel assembly 100, and rotate the Z-axis in two dimensions. Following this optimization procedure, the axis of the cylindrical coordinate system correlates with a high degree of precision to the wheel assembly actual axis of symmetry and the established pose of the wheel assembly imaged by the imaging sensor.

Figure 4:
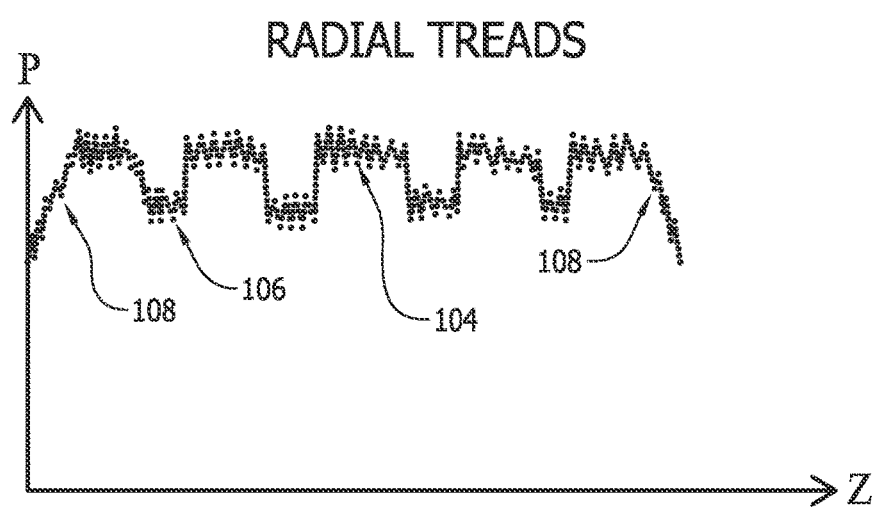
FIG. 4 is a graphical representation of data points in a depth map of a tire patch of a tire with a radial tread pattern, in the p-z plane of the cylindrical coordinate system of FIG. 2.

For a tire with radial treads (i.e., those having continuous circumferential channels or grooves) the initial p-z view of the point cloud data collapsed into a two-dimensional cross-section will appear as shown in FIG. 4. There are a large number of points at a larger p-value that represent the outer surface 104 of the tire tread throughout the observed region. There are also a fair number of points at a smaller p-value that represent the valley floor 106 of the tire tread within the same observed region. The lines will appear fuzzy if the estimate of the L-axis requires further optimization. The collection of outer surface points defining the outer surface 104 of the tire tread are filtered by creating a histogram of all the discrete point's p-coordinates. There will be a peak near the maximum p-value. Choosing the points in that peak provides a representation the outer surface 104 of the tire tread in the observed region. Those surface points are then fitted to a curve, such as a $2^{nd}$ or $3^{rd}$ order polynomial fit, that represents the curve of the outer surface of the tire tread, such as shown in FIG. 3. Subsequently, an optimization is then performed to adjust the L-axis in order to improve the fit of the of those surface points to the curves, which will sharpen the lines. It will be recognized that any curve-fit algorithms could be employed, such as spline interpolation, conic section fit, etc.), but a $2^{nd}$ or $3^{rd}$ order polynomial fit algorithm has been found to obtain sufficient results.

Figure 5:
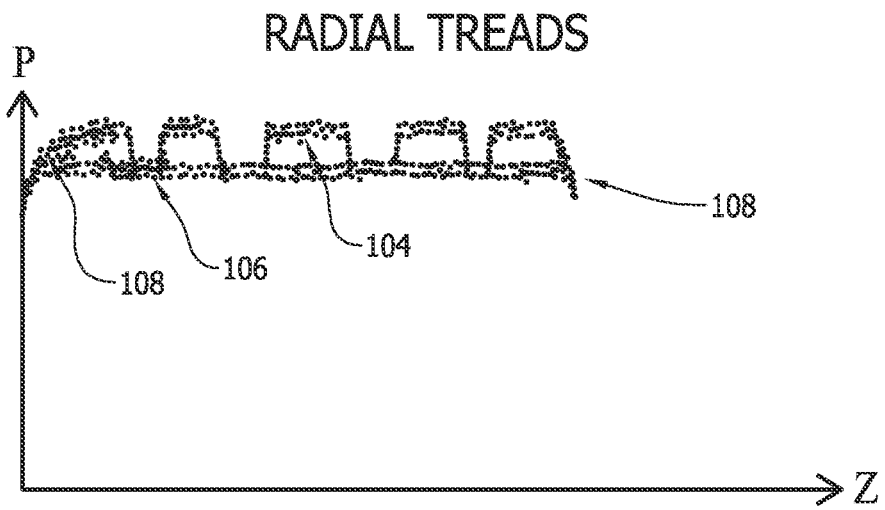
FIG. 5 is a graphical representation of the data in FIG. 4 after optimization and fitting.

After performing the optimization, the tire tread surfaces 104, 106 and tire shoulder profile 108 for the observed region will be sharper and the curve representing the outer surface will be established, such as shown in FIG. 5. At this point, the same histogram technique are applied to determine the points representative of the tread valley floor 106. This will identify a peak at the minimum p-values. Here again the valley floor points are fitted to a $2^{nd}$ or $3^{rd}$ order polynomial.

A measurement of tire tread depth at any point within the observed region is then based on the distance between the outer tire surface profile 104 and the tread valley floor profile 106. Metrics could also be established and computed for inner tire wear and outer tire wear based on the symmetry of the surface and valley profiles with the observed region. Abnormal deviations from the tire surface profiles within a region can be identified as possible damage to the tire surface or foreign objects embedded within the tire tread (i.e., rocks, road debris, etc.) The ability to identify both the outer tire surface profile 104 and the tread valley floor profile 106 facilitates a determination of tire tread depth at any point along the Z-axis with the observed region as a measure of the displacement between the two profiles. This enables measurements of tire tread depth to be obtained near the tire tread shoulders 108, as well as at tire tread blocks, such that tire tread depth measurement is no longer limited to a measure of the depth of an observed tire tread valley 106.

Figure 6:
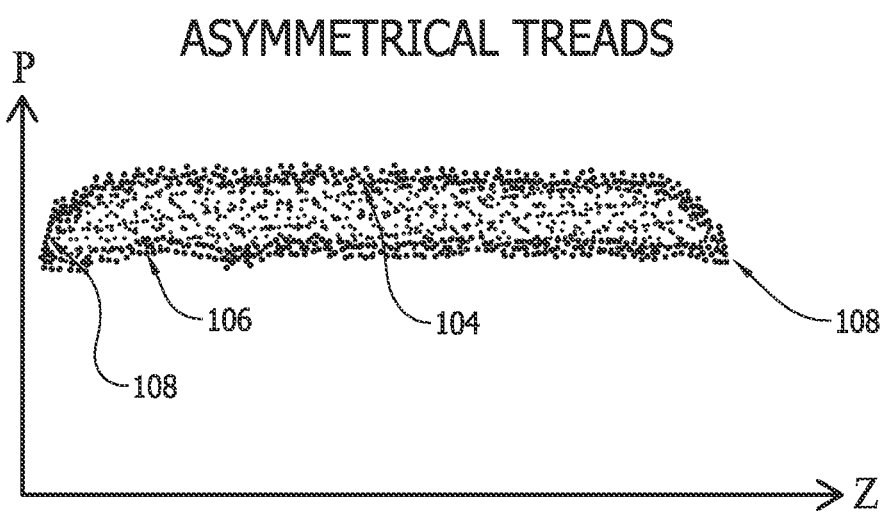
FIG. 6 is a graphical representation of data points in a depth map of a tire patch on a tire with an asymmetrical tread pattern, in the p-z plane of the cylindrical coordinate system of FIG. 2.

An image of an asymmetrical tire tread (i.e., one having no continuous circumferential channels or grooves), will appear a little different in the p-z plane as compared to a radial tire tread. For the asymmetrical tire tread, there may not be clear valleys as seen in FIGS. 4 and 5 for the radial tread tire. As shown in FIG. 6, the image includes upper profile that represents the outer tire surface 104 and a lower profile representing the tread valley floor 106, but there may be random points or noise in between those lines, where the edges of the tread blocks overlap. Optimization of the L-axis and fitting of the points similarly identify curves representing the outer surface profile and the tread depth of the tread valley floors within the observed region of the tire surface, as seen in FIG. 3, permitting the various metrics to be established and computed for inner tire wear and outer tire wear at any point along the Z-axis in the observed region, based on the symmetry of the surface and valley profile in substantially the same manner as previously noted, as well as for tire damage.

An alternative method for correlating a three-dimensional point-cloud to the observed surfaces in a region of a wheel assembly, including the tire tread region, utilizes a parametric model of the wheel assembly as shown in U.S. Pat. No. 7,583,372 B2. The wheel assembly can be described by a mathematical equation, such as a superquadric or hyperquadric equation, which contains parameters that can be adjusted to change the size and shape of the modeled wheel assembly. The model can be used in an optimization algorithm to vary the parameters for a best fit to the point cloud and thus define the location of the wheel assembly and an orientation of the axis of rotation.

The superquadric equation representing a toroid, which represents the simplest form of a wheel assembly, has six adjustable shape parameters. The superquadric equation is:

$$X = a_1 \times (a_4 + s_1 \times c_1^{e_1}) \times s_3 \times c_3^{e_2}$$

$$Y = a_2 \times (a_4 + s_1 \times c_1^{e_1}) \times s_4 \times c_4^{e_2}$$

$$Z = a_3 \times s_2 \times c_2^{e_1}$$

where:
$a_1$ scales the X direction;
$a_2$ scales the Y direction;
$a_3$ scales the Z direction;
$a_4$ scales the radius of the torus;
$e_1$ is the power term for the spherical angle $\eta$ which controls the shape of the torus cross-section;
$e_2$ is the power term for the spherical angle $\Omega$ which controls the shape of the torus;
$c_1 = \text{abs}(\cos(\eta))$;
$c_2 = \text{abs}(\sin(\eta))$;
$c_3 = \text{abs}(\cos(\Omega))$;
$c_4 = \text{abs}(\sin(\Omega))$; and
$s_1$ thru $s_4$ are the initial signs of the angles $\eta$ and $\Omega$ which must be reapplied after the exponentiation.

The spherical angles are swept from $-\pi$ to $\pi$ to generate a full torus.

An optimization is used to increment the a's and e's while sweeping $\eta$ and $\Omega$ to give a "best fit" to the acquired point-cloud data. The example given is a simple torus, but more complicated structures can be generated through the superposition of more than one superquadric. Those of ordinary skill will recognize that more elaborate shapes may be defined through the use of a hyperquadric equation.

Once the measurements of tire tread depth are obtained, the information may be utilized and displayed in a useful fashion. A measurement of tire tread depth at any point within an observed region of tire tread surface may be based on the distance between the established outer tire surface profile and the tire tread valley floor profile. Metrics may also be established and computed for inner tire wear and outer tire wear based on the symmetry of the surface and valley profiles with the observed region. Abnormal deviations from the tire surface profiles within a region can be identified as possible damage to the tire surface or foreign objects embedded within the tire tread (i.e., rocks, road debris, etc.) The ability to identify both an outer tire surface profile 104 and a tire tread valley floor profile 106 facilitates a determination of tire tread depth at any point with the observed region of a tire tread surface 102 as a measure of the displacement between the two profiles. This enables measurements of tire tread depth to be obtained near the tire tread shoulders 108, as well as at tire tread blocks, such that tire tread depth measurement is no longer limited to a measure of the depth of an observed tire tread valley.

Those of ordinary skill will recognize that there are a variety of techniques available for acquiring tire tread depth data for an observed portion of a tire tread surface 102, and that the display of tire tread depth information is generally independent of the specific methods and procedures utilized to acquire the initial measurements of the tire tread depth. Accordingly, any suitable method for acquiring tire tread depth data for at least a portion of a tire tread surface 102, and for generating a two or three-dimensional display 200 of such acquired tire tread depth data for display to an operator, in addition to those set forth herein may be utilized without departing from the scope of the present disclosure.

In one embodiment, a method is provided for presenting a visual display 200 of tire tread depth information to an operator following acquisition of the tire tread depth measurement data from a tire surface region. Initially, the acquired tire tread depth measurement data is processed to generate at least a two-dimensional image 200 which is representative of tire tread depth within the tire surface region for display to an operator. The generated image 200 is displayed, together with at least one numerical value 202 which is representative of a tire tread depth measurement at a specific point 204, or is representative of an average within a selected window or region 206 of the two-dimensional image. The generated image further includes an illustrated component which provides a visual indication 210, such as a line or connector between the displayed numerical value and the corresponding location in the two-dimensional image.

Preferably, the generated two or three-dimensional image 200 is configured to represent different tire tread depths with an array of colors selected from a common color pallet or grayscale spectrum. For example, the colors of the visible spectrum from red through violet, or shades of gray from light to dark may be utilized in a scaled fashion, such that portions of the image with tire tread features having the greatest vertical dimension are represented by one extreme of the color or grayscale array, which portions of the image with tire tread features having the smallest vertical dimension are represented by the opposite extreme of the color or grayscale array, and all intervening measurements are interpolated to corresponding intermediate colors or shades of gray between the two extremes. Those of ordinary skill in the art will recognize that the number of displayed colors or shades may either correspond directly to the number of discrete depth measurements, or alternatively, each displayed color or shade may represent a range of depth measurements. For example, all portions of a tire having a measured tread depth which exceeds a minimum recommended safe level may be displayed as green (or shades of green), while all portions of the tire which fail to have sufficient remaining tire tread are displayed as red (or shades of red).

While the presentation of tire tread depth information in the form of a two or three-dimensional image is visually interesting, it is not always the most useful format for conveying tire tread depth information. Most tire manufacturers and vehicle manufacturers recommend tire replacement when the tire's remaining tread depth is equal to, or less than, a specific numerical value, for example, 3/32 inches. Hence, vehicle service systems will typically display numerical data 202 which corresponds to actual measured tire tread depth for one or more selected points 204 in the two or three-dimensional image, or data which corresponds to an average tire tread depth for one or more selected windows 206 within said two or three-dimensional image. In order to enable an operator to view the two or three-dimensional image, and to relate the additionally displayed numerical data to specific points or regions within the image, a display 200 of the present disclosure incorporates a visual indication 210 which associates each display of numerical data with either a specific point or a specific window within the two or three-dimensional image. The visual indication 210 may take a variety of forms.

Figure 7:
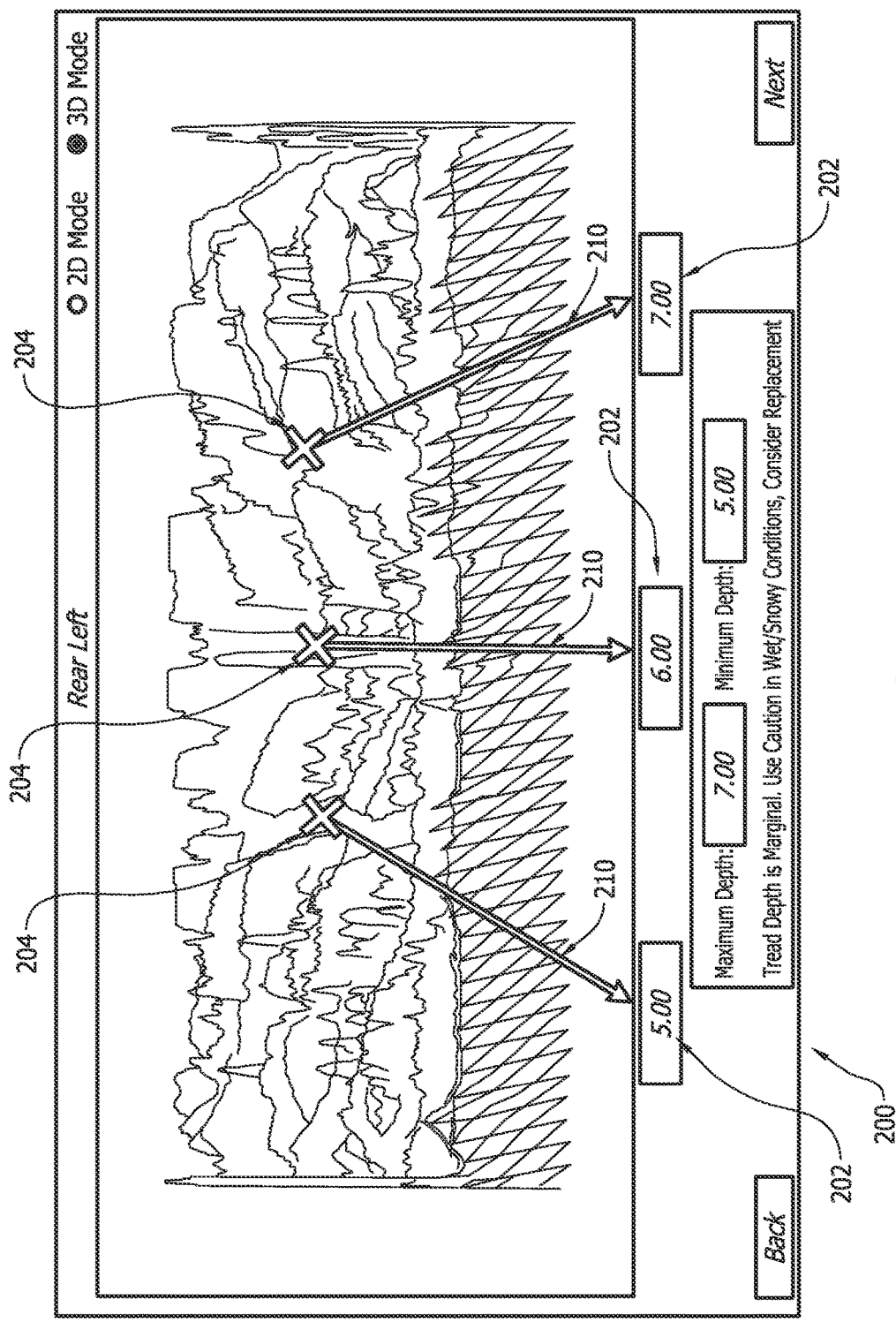
FIG. 7 is three-dimensional illustration of a tire tread region, annotated according to the present disclosure with numerical measurements and associated focus points within the three-dimensional illustration.
Figure 8:
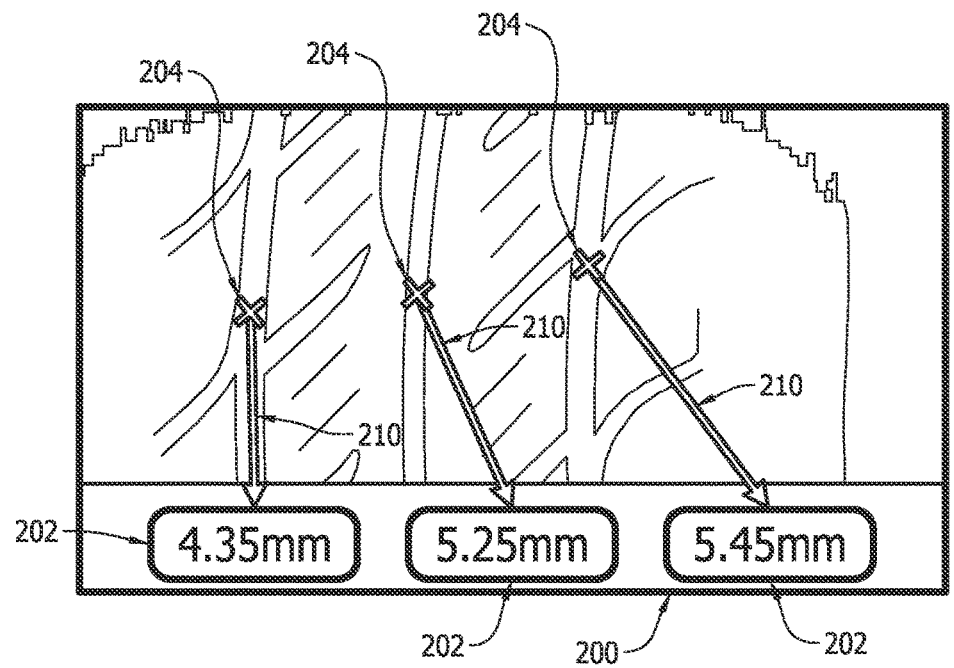
FIG. 8 is a two-dimensional illustration of a tire tread region having excessive tread wear, annotated according to the present disclosure with numerical measurements and associated focus points within the two-dimensional illustration.
Figure 9:
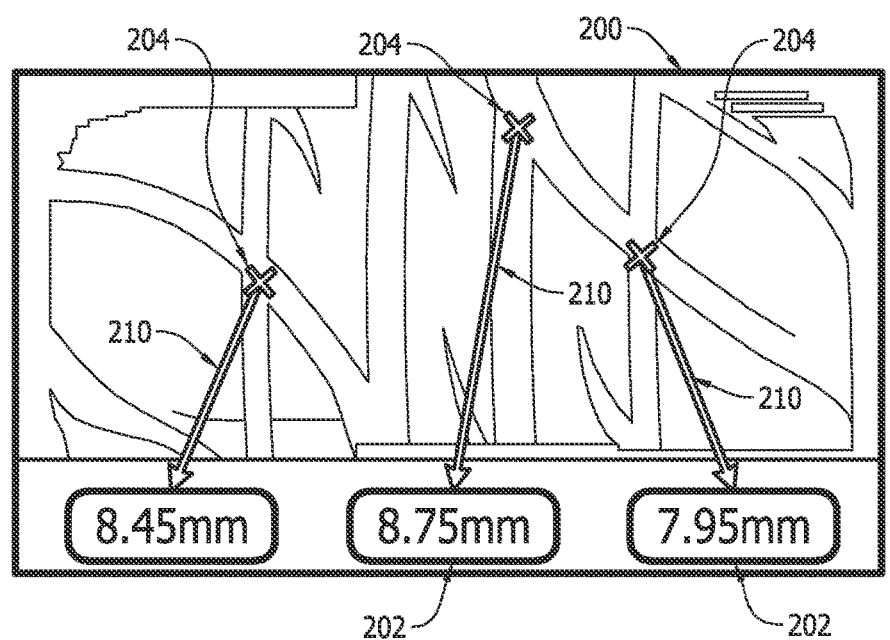
FIG. 9 is a two-dimensional illustration of a tire tread region having normal tread wear, annotated according to the present disclosure with numerical measurements and associated focus points within the two-dimensional illustration.
Figure 11:
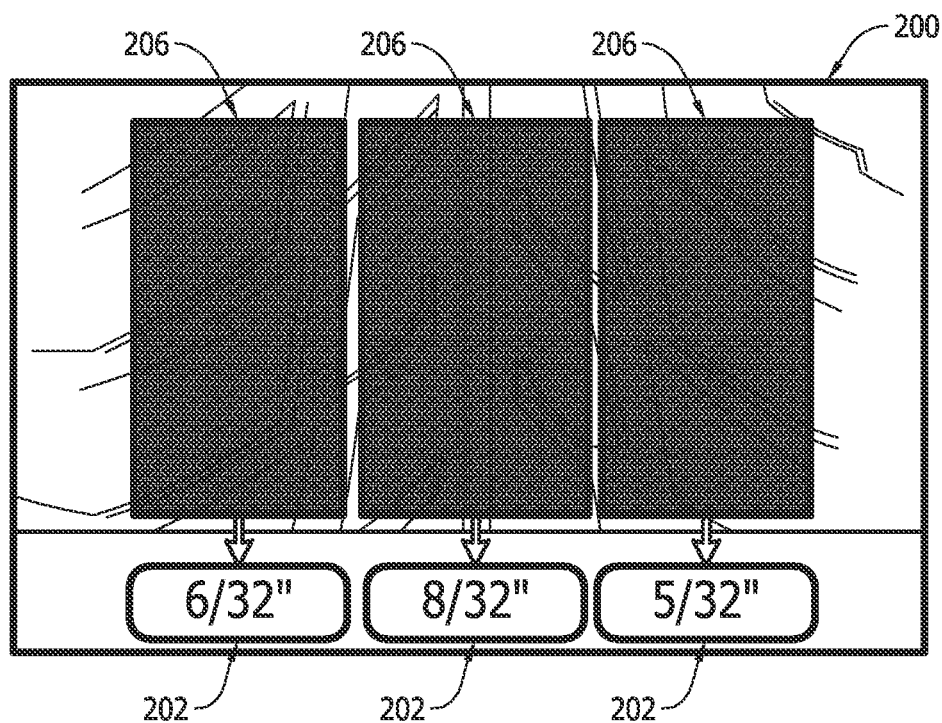
FIG. 11 is a two-dimensional illustration similar to FIG. 10, but wherein an averaged numerical measurement is displayed for three adjacent windows within the two-dimensional illustration.
Figure 12:
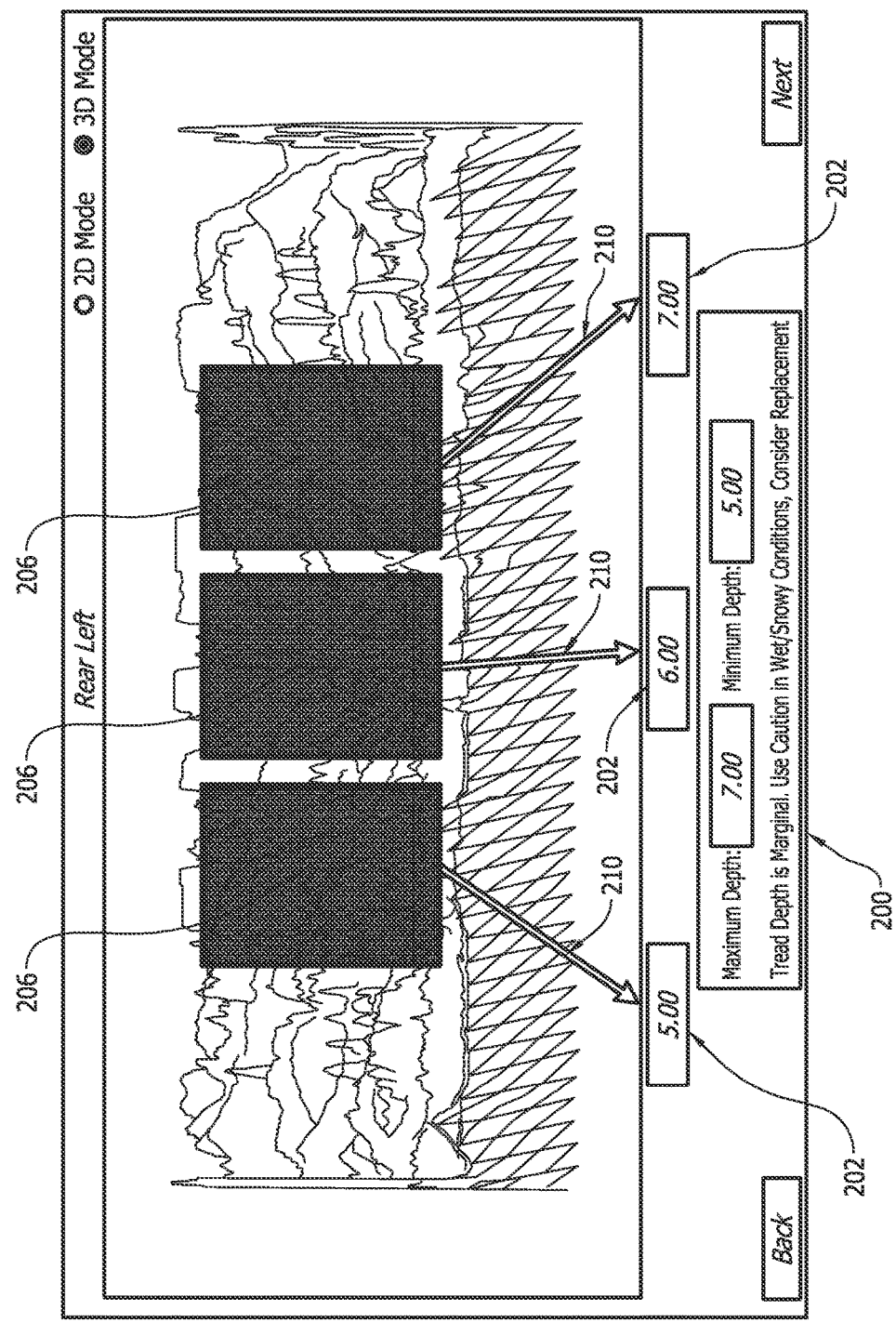
FIG. 12 is a three-dimensional variant of FIG. 11.

For example, as seen in FIG. 7, three discrete numerical values 202 for tire tread depth may be displayed in association with a three-dimensional image 200 of a portion of a tire tread surface. Each numerical value 202 is associated with a specific location 204 within the three-dimensional image, as indicated by a visible focus or target, such as an "X", which is linked to the corresponding numerical value 202 by a visually distinct arrow or indicator 210. Based on this display 200, and operator can easily utilize a manual tread depth measurement tool to verify the determined tire tread depth at the indicated locations, confirming the accuracy of the displayed numerical data. Similar visible focus points 204 may be displayed on two-dimensional images of tire tread surfaces, as seen in FIGS. 8 and 9. If the numerical value is representative of an average tire tread depth for a subset or windowed region 206 of the tire tread depth image 200, the visible focus or target 204 may be replaced by a bounding box which outlines the boundaries of the region 206 on the tire tread surface which is being averaged to produce the associated numerical value 202, such as shown in FIGS. 10, 11, and 12.

Figure 13:
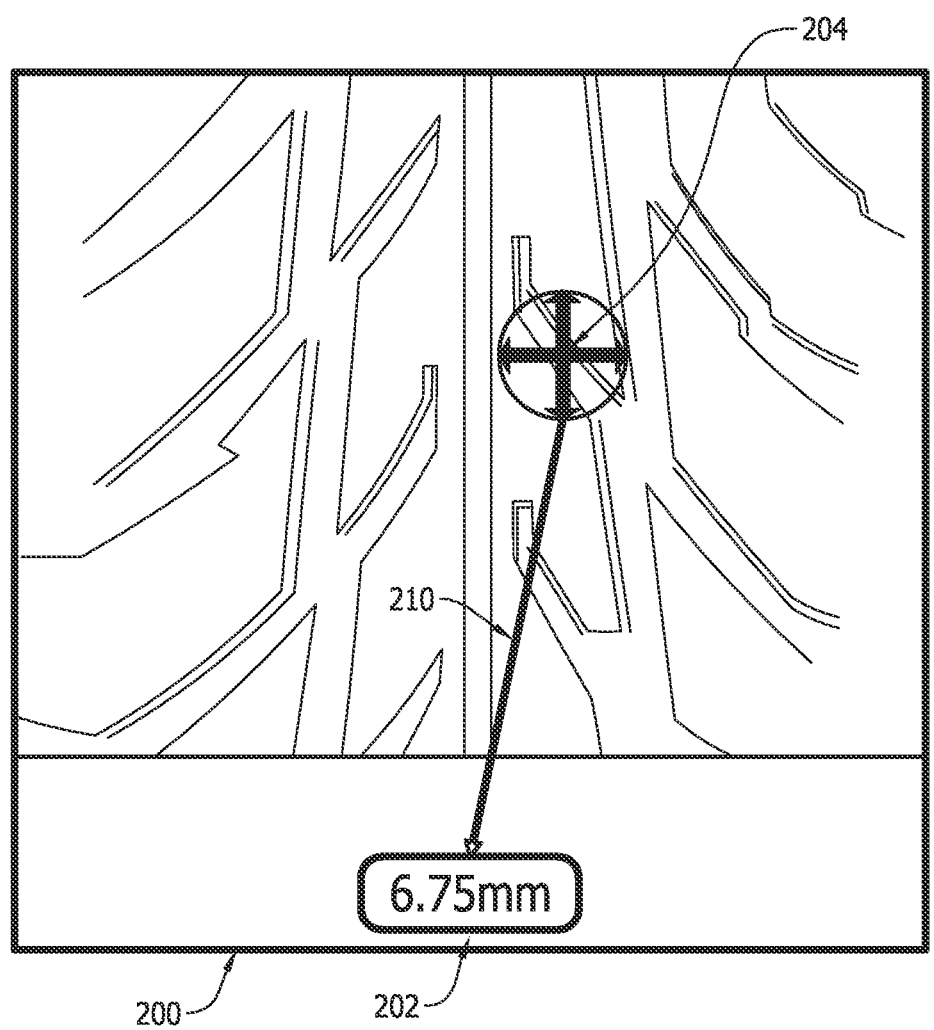
FIG. 13 is a two-dimensional illustration of a tire tread region, annotated according to the present disclosure with a numerical measurement and an associated positionable focus point within the two-dimensional illustration.
Figure 14A:
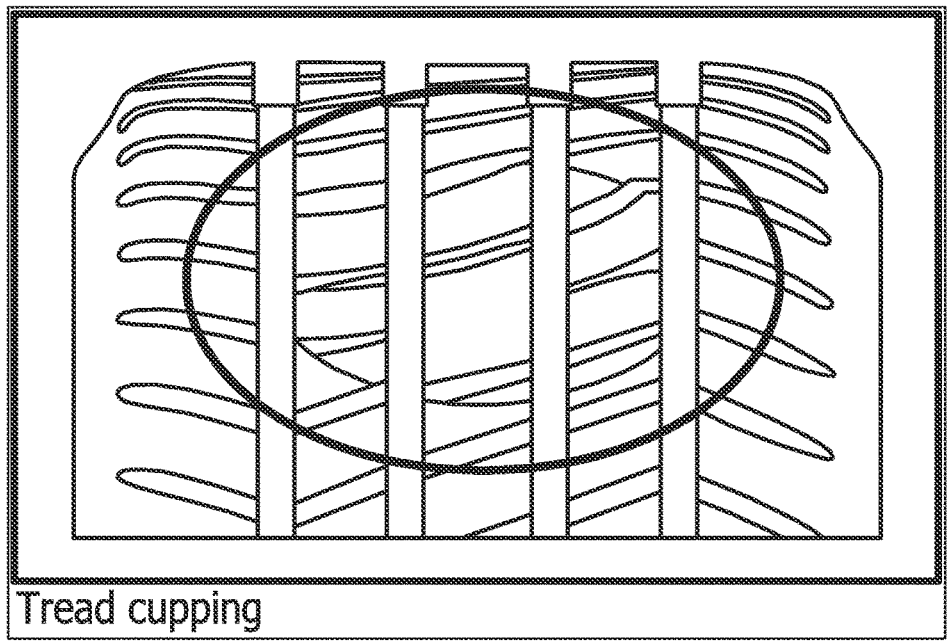
FIGS. 14A-14F illustrates various tire tread wear patterns that may be observed and correlated with various vehicle conditions or misalignment.
Figure 14B:
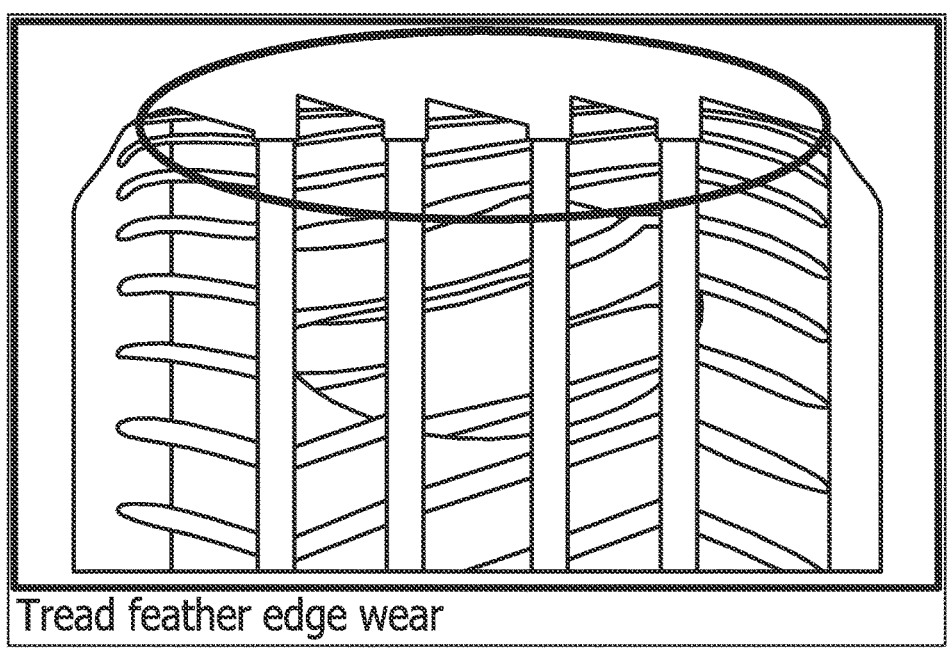
Figure 14C:
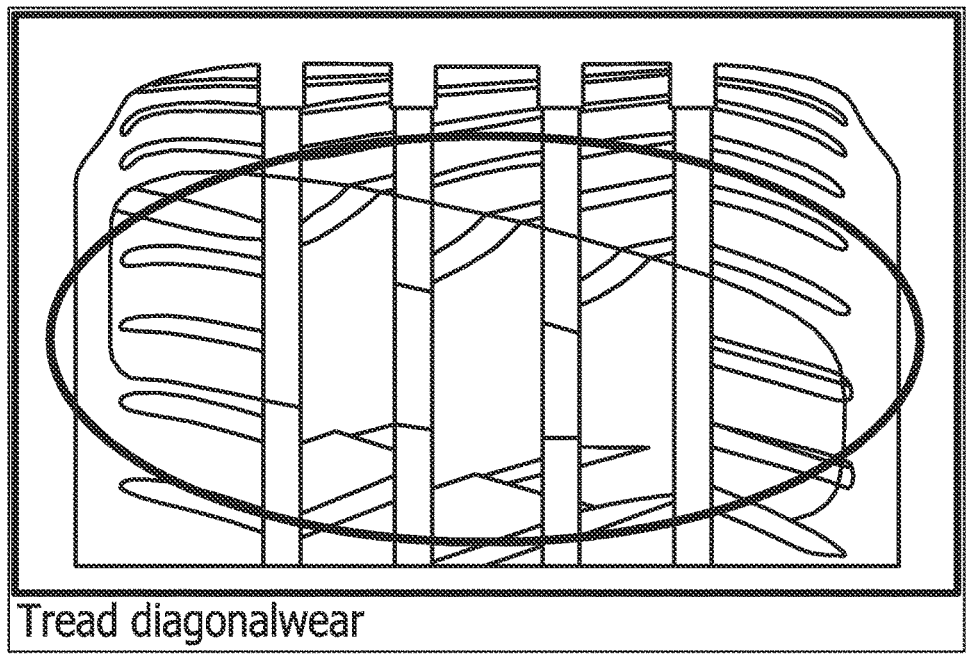
Figure 14D:
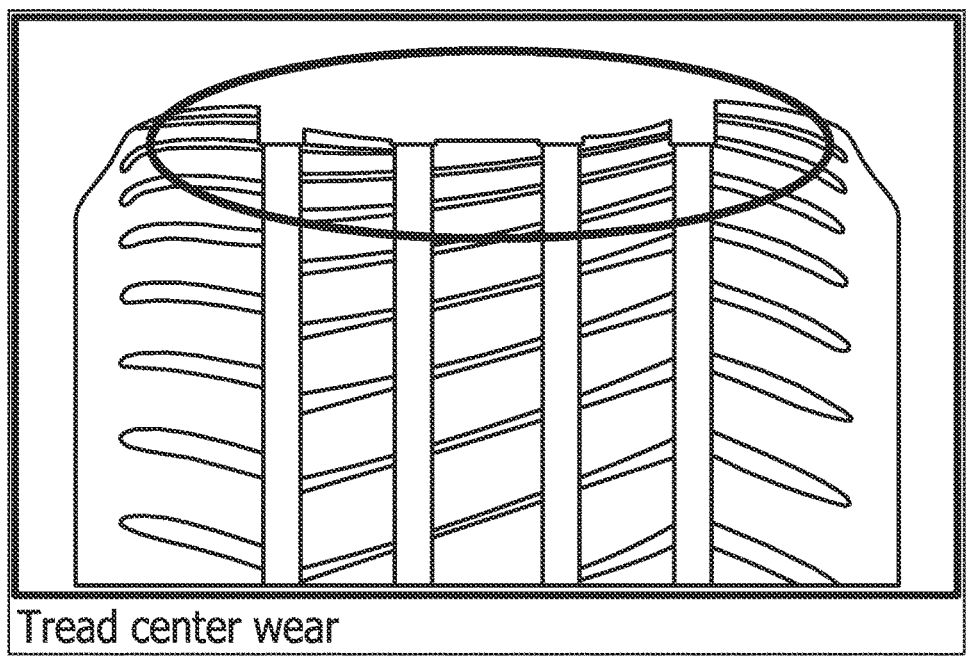
Figure 14E:
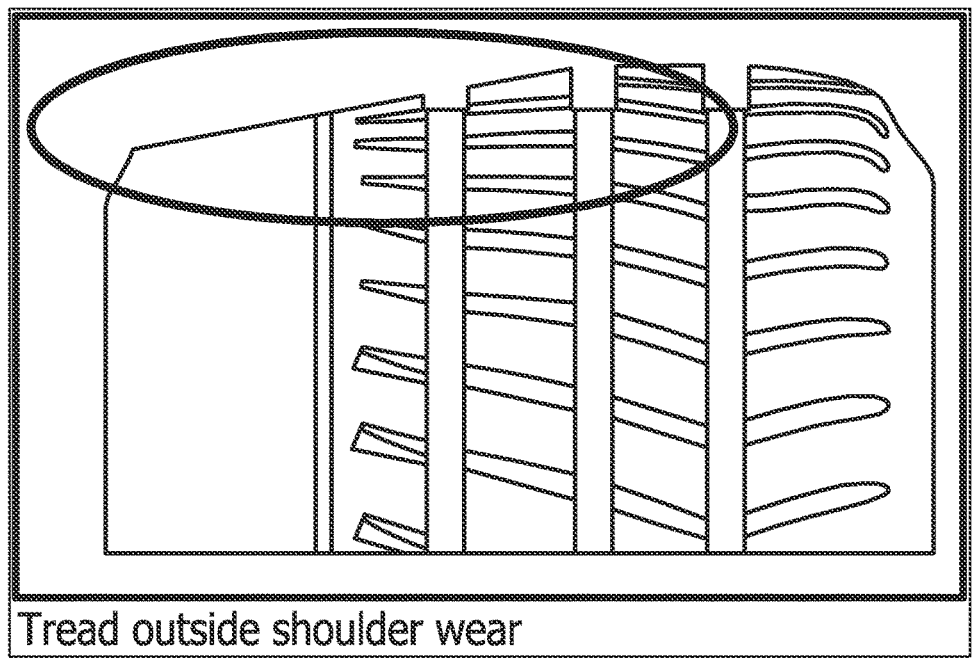
Figure 14F:
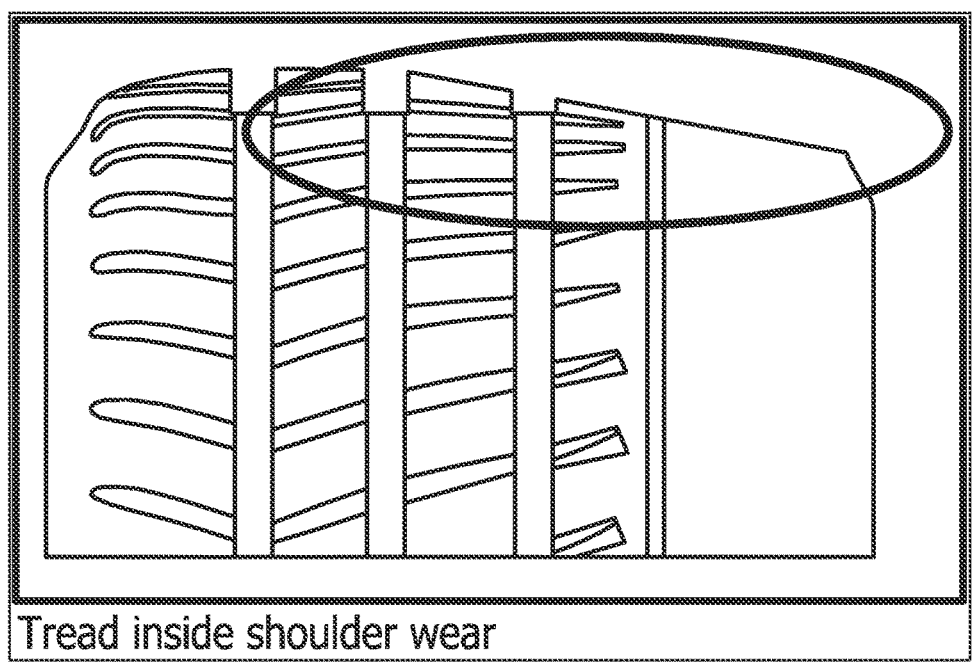

For some applications, it may be desirable for an operator to have the ability to specifically select one or more locations within a two or three-dimensional image 200 for which the specific numerical representation 202 of the tire tread depth is then displayed. This may be done by implementing the two or three-dimensional image 200 in the environment of a graphical user interface, wherein the operator can, through a suitable input device, identify a specific location 204 at which to place the visible focus or target within the two or three-dimensional image 200. Once placed, the displayed numerical data 202 is updated automatically to represent the tire tread depth at the current location of the visible focus or target. For example, as seen in FIG. 13, the operator may reposition the visible focus or target 204 within the two or three-dimensional image 200 using a touch-screen interface to simply select and drag it to a new location. The displayed numerical data 202 may either update while the visible focus or target is being moved, or may be updated only after the visible focus or target is placed at a new location within the image 200.

Figure 10:
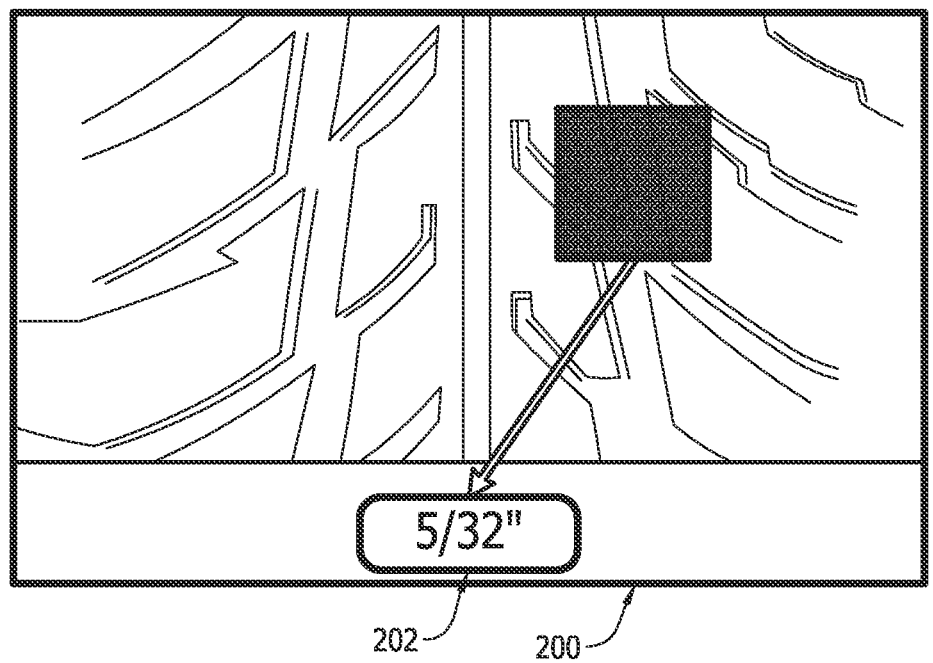
FIG. 10 is a two-dimensional illustration of a tire tread region, annotated according to the present disclosure with an averaged numerical measurement for a selected window within the two-dimensional illustration.

Those of ordinary skill in the art will recognize that the bounding box which outlines a window or selected region 206 of the two or three-dimensional image 200 for purposes of displaying an averaged numerical value for tread depth, such as shown in FIG. 10, may be similarly repositioned within the image by an operator to obtain an averaged numerical value for a different part of the displayed image 200. In addition, the dimensions of the bounding box or windowed region 206 may be selectively altered by the operator as desired, with corresponding updates to the averaged numerical value 202 being displayed.

Alternative methods for providing a visual indication of a specific point 204 or region 206 within a two or three-dimensional image 200 of a tire tread depth pattern having a specific tread depth may be utilized as well. For example, the two or three-dimensional image 200 may be displayed to an operator using a selected color or grayscale pallet, and all points within the image which correspond to the numerically displayed tread depth may be displayed using a color which is not part of the selected color or grayscale pallet, and which is visually contrasting. i.e., the image may be displayed in a range of grayscale shades, with all points measured to have a tread depth equal to or less than the selected numerical value displayed in a red color. By providing the operator with a suitable interface means to selectively adjust the numerical value between a minimum and a maximum (such as by means of a sliding scale), different portions of the image may be highlighted as corresponding to different tire tread dimensions.

Those of ordinary skill will recognize that a two or three-dimensional image 200 of a tire tread surface may be annotated in a variety of ways other than those which are described herein without departing from the scope of the present disclosure. Variations in the shape, size, color, or configuration of the visible focus, target, window, or bounding box graphical representations are innumerable, but in essence, each is a means by which a numerical value of tire tread depth, an average tire tread depth, or a range of tire tread depths may be visually identified and linked to specific point or region within the two or three-dimensional image. For example, a two or three-dimensional image 200 of the tire tread surface may be color-coded such that portions of the image having a tread depth of 0-$\frac{3}{32}$" may be shown in red, portions having a tread depth of $\frac{3}{32}$"-$\frac{5}{32}$" shown in yellow, and all other portions shown in green, effectively providing an operator with a simplified illustration of excessively worn, worn, and good portions of the tire tread surface. The specific number of such ranges utilized, as well as the actual measurements associated with each range, may be varied according to the specific level of detail which is intended to be conveyed by the colored image.

Two and three-dimensional images 200 of a tire tread surface prepared from acquired image data may be utilized in conjunction with vehicle data received from vehicle service systems, such as vehicle wheel alignment systems, vehicle wheel balancing systems, vehicle tire changing systems, and vehicle brake testing systems to present an operator with a comprehensive display which is representative of the current vehicle conditions, as well as predicted future conditions of the vehicle. A two or three-dimensional image 200 of a tire tread surface may be modified to represent expected tire conditions at various points in the future, assuming tire wear proceeds in a predetermined manner. For example, if it is assumed that under normal driving conditions, for a properly aligned vehicle, each tire will wear by approximately $\frac{1}{16}^{th}$ of an inch over a years of travel, a two or three-dimensional image 200 of the current tire tread surface may be modified by rendering the uppermost $\frac{1}{16}^{th}$ of an inch transparent, and re-scaling the remaining portions of the display, thereby producing an estimated image of the tire after one more years of usage.

Similarly, if the vehicle is found to be misaligned (based on data from a vehicle wheel alignment measurement system), the current two or three-dimensional image 200 of the tire tread surface may be modified to illustrate or emphasize the exaggerated wear effect which continued driving of the vehicle would have on the tire tread surfaces, such as shown in FIGS. 14A-14F, absent any necessary adjustments to the vehicle wheel alignment. By modeling future or predicted tire wear, starting with the current tire conditions as shown in the two or three-dimensional image 200 of the tire, a service technician can provide a customer with a visual representation of how quickly a tire may require replacement or become unsafe for certain driving conditions.

Data from a tire tread depth measurement system may be further utilized in conjunction with data from a vehicle brake tester to provide an operator with comprehensive brake performance results which account for the condition of the vehicle tires as well as the vehicle braking system. For example, if a tire is worn to near minimum tread depth, and continued usage would result in an increased stopping distance for the vehicle, the results of brake system performance measurements provided by a vehicle brake testing system may be modified to include information regarding the remaining tire tread depth, together with the possible negative effects worn tires may have on the vehicle braking performance. A report may be provided to the operator which provides a representation of the vehicle brake system condition as measured by the brake tester, a representation of the vehicle tire tread conditions, and a resulting vehicle braking performance evaluation based on the combined brake system and tire tread conditions.

Those of ordinary skill in the art will recognize that current tire tread depth measurements may be utilized by a variety of vehicle service devices to predict changes to the characteristics of a vehicle over time. For example, vehicle handling, fuel consumption, and tire life may all be influenced by the condition of the tire treads. Similarly, the current condition of the tire treads, such as shown in FIGS. 14A-14F, may provide some insight into how the vehicle is driven by an operator or owner. Accelerated wear patterns may indicate an aggressive driver who might be interested in performance-related services offered by a repair shop, or a performance-tuned replacement set of tires.

Figure 15A:
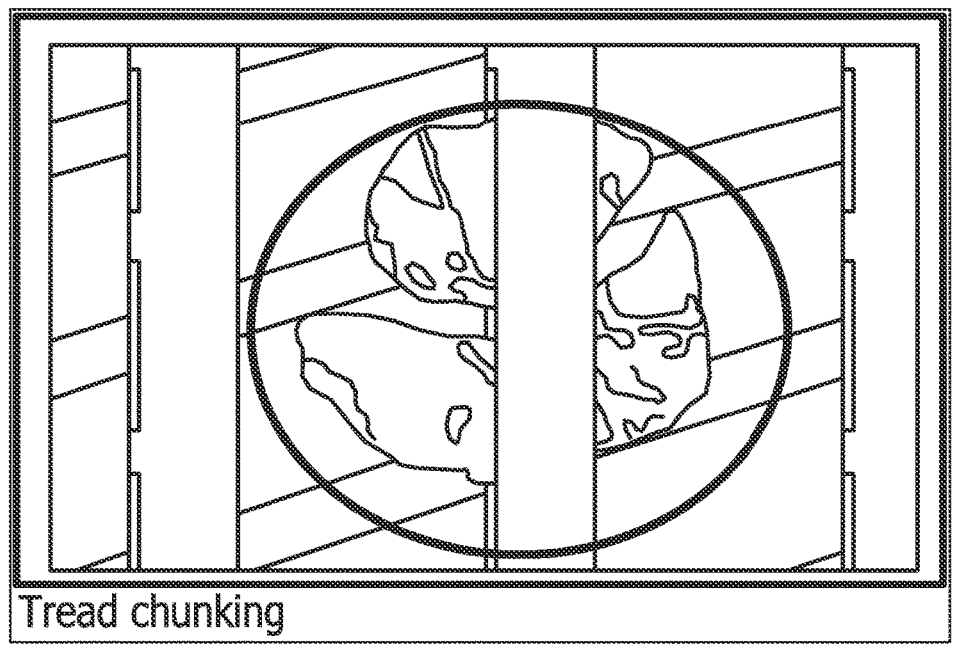
FIG. 15A-15C illustrates various examples of tire tread damage that may be detected and identified to an operator in two-dimensional tire tread illustration.
Figure 15B:
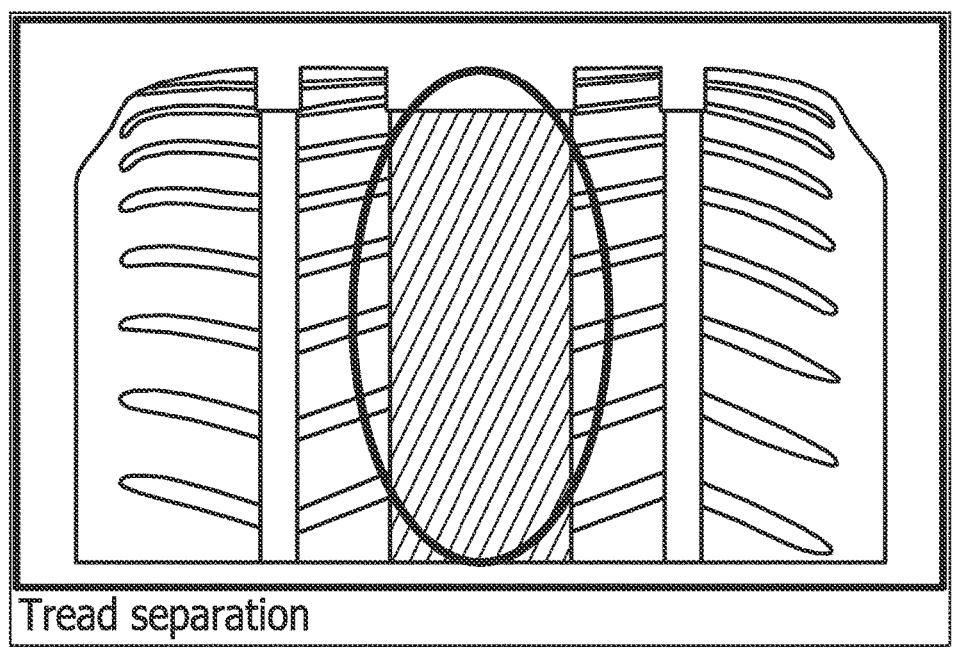
Figure 15C:
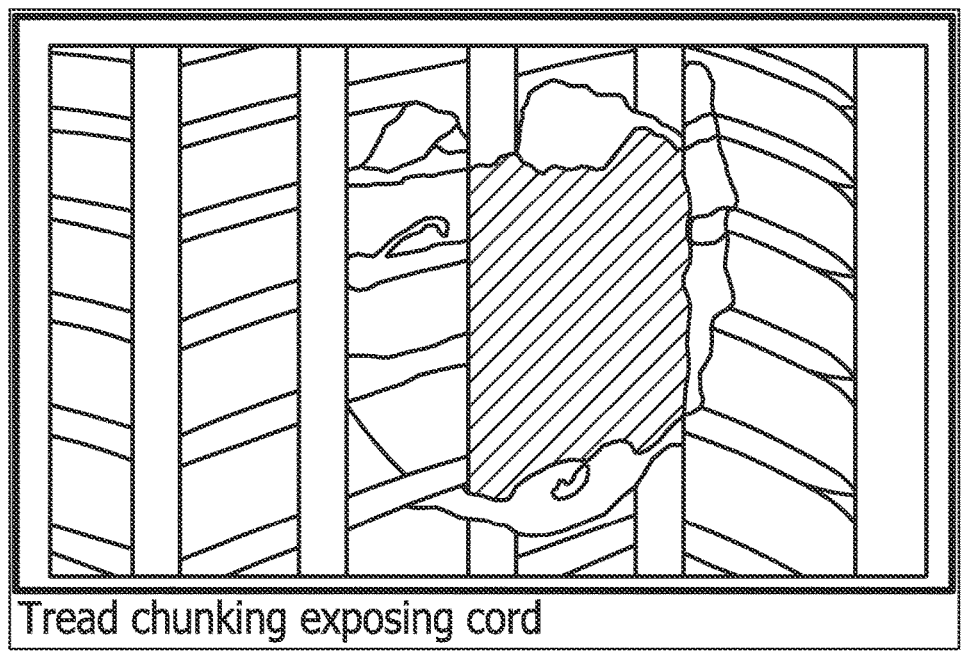

In addition to identifying and detecting specific wear patterns across the entire surface of a tire tread including the outer quarters, i.e., the shoulder regions 108, and annotating a two or three-dimensional image 200 of a tire tread surface 102 with specific tread depth measurements or averages 202, a system for processing tire tread depth images may be configured to identify specific types of tire tread damage, and provide a suitable annotation or warning to the operator. For example, as seen in FIGS. 15A-15C, excessive tire chunking or tire tread separation (exposing an underlying tire carcass) may be identified by deviations in observed tread depth patterns or excessively deep regions on the tire tread surface. Similarly, exposed internal belts or other excessive wear on the tire shoulders can be identified by either observed patterns or unusual tread depth measurements in regions where specific or small tread depths are expected (i.e. the shoulders).

Figure 16:
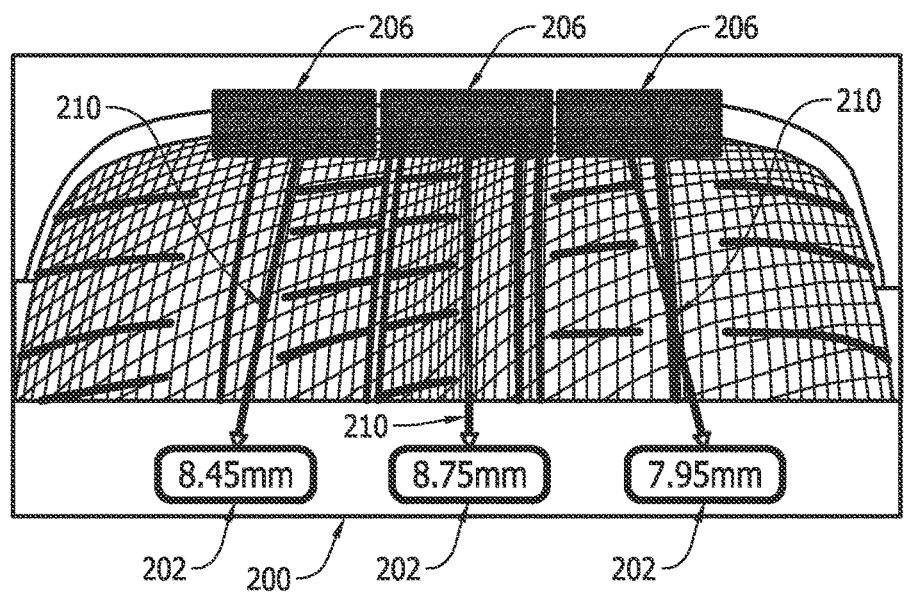
FIG. 16 is a is a cross-sectional illustration of a tire tread region, annotated according to the present disclosure with an averaged numerical measurement displayed for three adjacent windows within the cross-sectional illustration.

While the present disclosure has been illustrated generally in the context of two and three-dimensional views 200 of tire tread surfaces 102 and tire tread depths 202, those of ordinary skill in the art will recognize that the methods for annotating figures may be applied equally to cross-sectional illustrations of tire tread depths, such as shown in FIG. 16 and generated as described above.

The present disclosure can be embodied in-part in the form of computer-implemented processes and apparatuses for practicing those processes. The present disclosure can also be embodied in-part in the form of computer program code containing instructions embodied in tangible media, or another computer readable storage medium, wherein, when the computer program code is loaded into, and executed by, an electronic device such as a computer, micro-processor or logic circuit, the device becomes an apparatus for practicing the present disclosure.

The present disclosure can also be embodied in-part in the form of computer program code, for example, whether stored in a storage medium, loaded into and/or executed by a computer, or transmitted over some transmission medium, wherein, when the computer program code is loaded into and executed by a computer, the computer becomes an apparatus for practicing the present disclosure. When implemented in a general-purpose microprocessor, the computer program code segments configure the microprocessor to create specific logic circuits.

As various changes could be made in the above constructions without departing from the scope of the disclosure, it is intended that all matter contained in the above description or shown in the accompanying drawings shall be interpreted as illustrative and not in a limiting sense.

The invention claimed is:

1. A machine vision vehicle service system having a processing unit configured with a set of software instructions, and at least one imaging system operatively coupled to the processing unit, the improvement comprising:
   wherein said imaging system is disposed to view a surface region of a vehicle wheel assembly, said surface region including a three-dimensional portion of a tire tread surface on an associated vehicle wheel assembly;
   wherein the processing unit is further configured to determine at least one vehicle wheel parameter for said vehicle wheel assembly from a generated point cloud of data points representative of at least the three-dimensional portion of the tire tread surface developed by the processing unit from images of said surface region acquired by said imaging system; and
   wherein said at least one vehicle wheel parameter includes a measure of tire tread depth determined from a comparison between said point cloud data points fitted to a tire tread cross-section curve representative of a tire tread outer surface within said surface region and a tire tread cross-section curve representative of a tire tread valley floor surface within said surface region.

2. The machine vision vehicle service system of claim 1 wherein said generated point cloud of data points of said tire tread surface is represented in a cylindrical coordinate system with an axis of said cylindrical coordinate system representative of an estimated wheel axis.

3. The machine vision vehicle service system of claim 2 wherein said processing unit is configured to estimate a tire tread depth measurement over said three-dimensional portion of tire tread surface by processing said data points in said cylindrical coordinate system to collapse said points into a single plane of the cylindrical coordinate system which is longitudinally perpendicular to said estimated wheel axis.

4. The machine vision vehicle service system of claim 3 further including the step of filtering said collapsed data points by generating a histogram of point coordinates collapsed into said single plane of said cylindrical coordinate system;
   wherein a radial direction maximum peak in said generated histogram is representative of data points on a tire tread outer surface, said outer surface data points within said single plane defining said curve representative of a contour of the tire tread outermost surfaces; and
   wherein a radial direction minimum peak in said generated histogram is representative of data points on a tire tread recessed surface, said recessed surface data points within said single plane defining said curve representative of said tire tread valley floor surfaces.

5. The machine vision vehicle service system of claim 1 further including a rotating shaft upon which said vehicle wheel assembly is mounted for controlled rotation about an axis; and
   wherein said surface region extends circumferentially about said vehicle wheel assembly.

6. The machine vision vehicle service system of claim 1 wherein said measure of tire tread depth is associated with a tire shoulder region of said vehicle wheel assembly.

7. A method for measuring a tread depth within a region on the surface of a wheel assembly tire, said region having an axial width and an arcuate length along a circumference of the wheel assembly, comprising:
   acquiring image data representative of at least a portion of the tire surface including said region;

processing said acquired image data to generate a two-dimensional representation of said region, said two-dimensional representation denoting both an outer surface of the tire tread and a lower surface of the tire tread over an axial width equal to the axial width of said region; and wherein a measure of tread depth at a selected location within said region on said surface of said wheel assembly tire is determined by a comparison of said denoted outer surface within said two-dimensional representation at an axial position of said selected location along said axial width of said region with said denoted lower surface within said two-dimensional representation at said axial position of said selected location along said axial width of said region.

8. The method of claim 7 wherein said step of processing further includes:

generating a point cloud of discrete data points in a three-dimensional coordinate system about an axis of rotation for the wheel assembly, said point cloud representative of points in said region on said surface of said wheel assembly tire;

processing said point cloud of discrete data points to individually rotate each of said data points about said axis of rotation into a common plane; and evaluating histogram peaks of radial distances of said data points from said axis of rotation within said common plane to establish said representation denoting said outer surface and said lower surface of the tire tread within said common plane.

9. The method of claim 7 further including the step of utilizing said two-dimensional representation to compare said denoted outer surface of the tire tread within said region on said surface of said wheel assembly tire with the denoted lower surface of the tire tread within said region on said surface of said wheel assembly tire to evaluate a symmetry of the tire across said axial width of said region on said surface of said wheel assembly tire.

10. The method of claim 7 wherein said selected location within said region on said surface of said wheel assembly tire is associated with a shoulder region of said wheel assembly tire.

11. A method for presenting a visual display of tire tread depth information associated with a vehicle wheel assembly, comprising:

acquiring tire tread depth measurement data from a plurality of points within a tire surface region;

processing said acquired tire tread depth measurement data to generate at least a two-dimensional image of said tire surface region which is representative of tire tread depth at said plurality of points within said tire surface region for display to an operator;

displaying a plurality of numerical values representative of tire tread depth measurements in association with said two-dimensional image; and visually indicating an association between each of said displayed numerical values and associated tire tread depth measurement points at locations within said two-dimensional image.

12. The method of claim 11 wherein said two-dimensional image of said tire surface region represents said tire tread depth at said plurality of points with an array of colors, wherein each color within said array of colors corresponds to a unique measure of tire tread depth.

13. The method of claim 11 wherein said at least one numerical value is representative of a tire tread depth measurement at a specific point within said two dimensional image; and wherein said step of visually indicating said association includes providing a visual connection between said displayed numerical value and said specific point.

14. The method of claim 13 further including the step of selectively positioning said specific point within said two dimensional image.

15. The method of claim 11 wherein said at least one numerical value is representative of an average tire tread depth over measurement points within a window denoting a selected region within said two dimensional image; and wherein said step of visually indicating said association includes providing a visual connection between said displayed numerical value and said window within said two-dimensional image.

16. The method of claim 15 further including the step of visually identifying the boundaries of said window within said two-dimensional image.

17. The method of claim 11 wherein said two-dimensional image represents said tire tread depth with an array of colors selected from a palette of colors or range of grays, together with at least one distinct color not otherwise included in said palette of colors or said range of grays;

wherein each distinct representation within said palette of colors or range of grays corresponds to a unique measure of tire tread depth; and wherein said at least one distinct color is utilized to illustrate portions of said two-dimensional image which are representative of said tire tread depth corresponding to said at least one numerical value.

18. The method of claim 11 wherein said two-dimensional image represents said points of tire tread depth with elements selected from at least one of a palette of colors or a range of grays;

wherein at least one distinct color is selected to illustrate points within said two-dimensional image representative of at least one range of tire tread depths.

19. The method of claim 18 wherein said at least one range of tire tread depths represents points at which said tire tread depth fails to exceed a selected minimum depth.

20. The method of claim 18 wherein said at least one range of tire tread depths represents points at which said tire tread depths exceed a selected minimum depth.

21. A method for presenting a visual display of tire tread depth information associated with a vehicle wheel assembly, comprising:

acquiring tire tread depth measurement data from a plurality of points within a tire surface region;

processing said acquired tire tread depth measurement data to generate at least a two-dimensional image of said tire surface region representative of tire tread depth at said plurality of points for display to an operator; and wherein a portion of said two-dimensional image of said tire surface is highlighted with at least one distinct color to illustrate points within said two-dimensional image which are representative of at least one range of tire tread depths.

22. The method of claim 21 wherein said at least one range of tire tread depths represents points at which said tire tread depth fails to exceed a selected minimum depth.

23. The method of claim 21 wherein said at least one range of tire tread depths represents points at which said tire tread depths exceed a selected minimum depth.

24. The method of claim 21 for presenting a visual display of tire tread depth information associated with a vehicle wheel assembly, wherein said at least one distinct color illustrates points within said two-dimensional image which are representative of said at least one range of tire tread depths and which deviate from an expected tire tread wear pattern; and responsive to said tire tread depths deviating from said expected tire tread wear pattern, presenting in association with said generated image, at least one annotation warning of possible tire damage.

25. The method of claim 24 wherein said deviation from said expected tire tread wear pattern includes an absence of a tire tread surface, indicative of tire damage including at least one occurrence of tread chunking, tread separation, or an exposed belt.

26. The method of claim 24 further including visually representing, within said generated image, said tire tread depth measurement data deviating from said expected tire tread wear pattern.

27. The method of claim 24 wherein said tire tread depth measurement data deviating from said expected tire tread wear pattern deviates from either an observed tire tread depth pattern, or from an expected tire tread depth pattern.

28. The method of claim 24 wherein said tire tread depth measurement data deviating from said expected tire tread wear pattern includes tire tread depth measurements which exceed a lower surface of the tire tread to penetrate an underlying tire carcass.

\* \* \* \* \*